United States Patent Office 3,525,782
Patented Aug. 25, 1970

3,525,782
ACYLDIPHOSPHONATES
James Keith Jacques, Handsworth Wood, Birmingham, England, assignor to Albright & Wilson (Mfg.) Limited, Oldbury, near Birmingham, Warwickshire, England, a British company
No Drawing. Filed July 7, 1965, Ser. No. 470,218
Claims priority, application Great Britain, Aug. 6, 1964, 32,081/64; Jan. 8, 1965, 936/65
Int. Cl. C07f 9/28; C08g 17/133
U.S. Cl. 260—932
2 Claims

ABSTRACT OF THE DISCLOSURE

The invention provides phosphonate esters having the formula

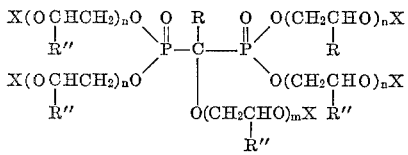

wherein $m$ is a number from 0 to 20, each $n$ is a number from 1 to 20, each X is selected from the group consisting of hydrogen and acyl residues of carboxylic acids with at least one X being hydrogen, R is selected from the group consisting of alkyl, chlorinated alkyl, phenyl, and chlorinated phenyl groups having up to 10 carbon atoms, and each R″ is selected from the group consisting of hydrogen, methyl, chloromethyl and bromomethyl groups. The invention also provides a process for preparing phosphonate esters in which an acyldiphosphonic acid is reacted with at least one mole of an alkylene oxide per equivalent of phosphorus-bonded hydroxyl group in said acyldiphosphonic acid. The phosphonate esters are used to prepare polyester materials having flame-retardant properties.

---

The present invention provides polymers having improved flame retardancy and novel compounds for use in the preparation thereof. The invention relates more particularly to polyester materials such as may be used for the manufacture of resins, laminates, adhesives and surface coatings. Polyester as used herein means a polymer of the kind produced by condensation of one or more polybasic acids with one or more polyhydric alcohols. The definition includes polyesters prepared initially so as to contain ethylenic unsaturation and subsequently cured, i.e. cross-linked, by copolymerisation with a minor proportion of a vinylic material such as styrene.

When it is desired to modify polyester materials, for example with a view to improving their flame-retardance, it is advantageous to employ a monomer unit capable of being directly incorporated in the polymer molecule thereby rendering the polymer molecule itself flame-retardant. It has been proposed to use in this way certain hydroxy esters of phosphoric acid. In particular, it has been proposed to use as an ingredient in the preparation of modified polymers of this type the product of the reaction between an alkylene oxide and phosphoric acid. Typical esters of this type include the compound of formula $(HOCH_2CH_2O)_3PO$ prepared from phosphoric acid and ethylene oxide. Other alkylene oxides which have been used include epichlorphydrin and propylene oxide. Such esters possess 3 hydroxyl groups and may be reacted with dicarboxylic acids such as maleic acid, phthalic acid, chlorendic acid (an adduct of hexachlorocyclopentadiene with maleic acid) or with anhydrides of any of these acids. By incorporating in such polymers other di- or tri-functional alcohols such as ethylene glycol or glycerol and by curing with ethylenically unsaturated compounds such as styrene a wide range of polyester materials may be provided having varying degrees of flame-retardance.

In this specification flame-retardance means a reduced tendency to burn when a substance is ignited in a flame which is subsequently withdrawn. The flame-retardance may be tested by igniting a strip of material in this manner, allowing the flame to be extinguished and reigniting the material and determining the time taken for the flame to be extinguished at the second ignition. The degree of flame-retardance hitherto achieved, has been insufficient to permit polyester resins to be used safely for certain purposes, and even such flame retradance has often only been achieved at the expense of other desirable properties such as strength and flexibility.

I have now discovered that polyesters having improved flame-retardancy may be prepared by incorporating therein an acylidiphosphonic acid, or derivative thereof, which possesses one or more active hydrogen atoms contained in alcoholic or phosphonic acid —OH groups. We have further discovered certain novel precondensates of acyldiphosphonic acids as aforesaid which may advantageously be employed for modifying polyester materials.

Accordingly from one aspect my invention consists in a modified polyester comprising in the structure thereof units of the formula

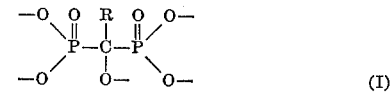  (I)

where R is a hydrocarbon or substituted hydrocarbon group.

Acyldiphosphonic acids have the formula

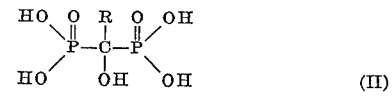  (II)

The molecule has four acidic, phosphorus-bonded —OH groups, and also a carbon-bonded —OH group. The phosphorus-bonded —OH groups may be reacted with alcohols to form products herein referred to as "acyldiphosphonate esters," for example by refluxing the acylidphosphonic acid with an alcohol in the presence of xylene or toluene, and removing water as an azeotrope. Alternatively they may be reacted with alkylene oxides to form hydroxyalkyl esters, or where more than an equivalent of alkylene oxide is employed, hydroxy polyalkyleneoxy esters, herein referred to as "precondensates." The carbon-bonded hydroxyl group may be reacted with carboxylic acid chlorides or anhydrides to form products herein referred to as "acylated acylidiphosphonic acids," or with alkylene oxides to form precondensates. The precondensates have up to five free alcoholic hydroxyl groups and may themselves be reacted with carboxylic acid anhydrides or chlorides to form products herein referred to as "acylated precondensates."

The above classes of esters, precondensates and acylated products are referred to jointly herein as "derivatives of acyldiphosphonic acids." Certain of these derivatives are novel compounds, which have from one to give free acidic or alcoholic hydroxyl groups, and which may then be incorporated into polyesters, by including them in suitable reaction mixtures of polybasic acids and polyhydroxy alcohols.

The invention thus also comprises, novel derivatives of acyldiphosphonic acids, suitable for use in the preparation of modified polyesters, which are formed when an acyldiphosphonic acid or an ester or partial ester thereof, or an acylated acyldiphosphonic acid or a partial ester thereof is condensed with from one to a hundred molar proportions of ethylene oxide, propylene oxide, epichlorhydrin or epibromhydrin, and optionally thereafter is partially acylated to form a product having at least on hydroxyl function per molecule.

Accordingly, from a second aspect, the invention provides a novel compound having the general formula

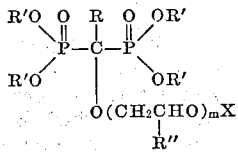

wherein R is a hydrocarbon or substituted hydrocarbon group, $n$ is 0 to 20, ' is a hydrocarbon or substituted hydrocarbon group or a group of the formula

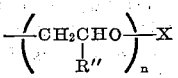

(at least one R' group being of the formula

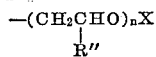

if $m$ is 0) $n$ is 1 to 20, at least one X is hydrogen, any other X groups being either hydrogen, or an acyl or alkyl group and R'' is hydrogen or a methyl or halomethyl group.

Also, from a third aspect the invention provides a process for preparing a novel compound according to the invention which method comprises reacting an acyldiphosphonic acid or an ester or acid ester thereof, or an acylated acyldiphosphonic acid or an acid ester thereof with at least one mole of ethylene oxide, propylene oxide, epichlorhydrin or epibromhydrin, the proportions being at least one mole of the alkylene oxide per equivalent of phosphorus-bonded hydroxyl groups.

From yet a fourth aspect the invention provides a method of preparing a polyester according to the invention which comprises reacting a polycarboxylic acid or acid anhydride or mixture of polycarboxylic acids or acid anhydrides with a polyhydroxyl alcohol or mixture of polyhydroxy alcohols in the presence of an acyl diphosphonic acid of the formula

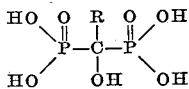

where R is a hydrocarbon or substituted hydrocarbon group, or with an ester of such an acyldiphosphonic acid which possesses at least one acidic or alcoholic OH group.

Thus the units (I) may be incorporated in polyester molecules by the use of an acyldiphosphonic acid (II) or a partial ester thereof, for example by heating the acid or acid ester, or a mixture of polybasic acids which comprises the acid or acid ester, with at least one compound which contains two or more alcoholic hydroxyl groups. Alternatively the acyldiphosphonic acid may be converted into a precondensate which may be one of the novel compounds of the present invention. Such precondensates are alcohols, having from one to five hydroxyl groups and may be reacted with polybasic acids, or with the anhydrides of such acids, to form a modified polyester of the invention. The functionality of the precondensate may be controlled by acylation of up to four of the alcoholic hydroxyl groups, and that of the acids (II) by esterification with up to four moles of a monohydric alcohol or by acylation of the carbon bonded hydroxyl group, provided in each case that at least one free —OH group is retained.

A particular advantage of preparing a precondensate or a partial ester of an acyl diphosphonic acid and using this to modify a polyester, is that the functionality of such precondensates and esters may be closely controlled over a very wide range by end-stopping one or more of the five —OH groups of the original acyldiphosphonic acid molecule. For example, if a precondensate having five hydroxyl groups is acylated by reacting with three molar proportions of acetyl chloride or benzoyl chloride, the resulting dihydroxy alcohol may be used to make simple linear polyesters. By using precondensates having three or more free hydroxyl groups, polyesters may be prepared having an increased degree of cross linking. Precondensates having only one hydroxyl group are valuable as chain stoppers for terminating the polymerisation reaction. Similarly acids of Formula II may be esterified with monohydric alcohols to control the number of —OH groups.

The acyldiphosphonic acid for use according to my invention may be prepared by reacting a phosphorus trihalide with an anhydrous carboxylic acid followed by steam distillation, or by the action of a carboxylic anhydride or acyl chloride on phosphorus acid.

The preferred acyldiphosphonic acid for use according to the method of our invention is acetodiphosphonic acid, (II), R=CH$_3$. Other diphosphonic acids which may be employed include propiondiphosphonic acid, phenylacetodiphosphonic acid, p-chlorophenylacetodiphosphonic acid, monochloracetodiphosphonic acid and octanodiphosphonic acid.

Where an alkylene oxide

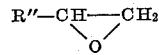

in excess of one molar proportion per free hydroxyl group is employed and the temperature is allowed to rise above 60° C. the product will consist of a mixture of compounds containing groups of the general formula

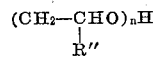

wherein each $n$ has a value greater than 1. The product will include a spectrum of compounds in which the total number of alkyleneoxy units in each molecule varies, the average number corresponding to the number of molecular proportions of alkylene oxide employed. It is to be understood that references herein to a single compound containing polyalkyleneoxy chains are to be construed as including a reference to mixtures of such compounds with different values of $n$ and/or $m$. It is generally preferred to use from 9 to 15 molar proportions alkylene oxide and one molar proportion of acyldiphosphonic acid.

If it is desired to retain the carbon-bonded hydroxyl group of the acyldiphosphonic acid after condensation, this may be acylated prior to reaction with the alkylene oxide and subsequently hydrolysed when the reaction with alkylene oxide is complete. If desired, the acyldiphosphonic acid may be esterified with up to four molar proportions of a monohydric alcohol prior to any condensation with alkylene oxide, provided that at least one free —OH group is retained in the resulting ester. Such a monohydric alcohol may, if desired, be a mono-ether or ester of an alkylene or polyalkylene glycol. Esters or partial esters of the acid (II) or acylated acid, may be prepared by refluxing the acid with the desired proportion of monohydric alcohol in the presence of xylene or toluene to remove as an azeotrope, the water formed in the reaction.

The acylation of an acyldiphosphonic acid may be performed by means of the normal Schotten-Baumann method. Typically one mole of acyldiphosphonic acid is warmed with one mole of an acetyl or benzoyl chloride, or of acetic anhydride.

The preferred method of preparation of the condensates of the invention comprises reacting the acyldiphosphonic acid (which may first have been acylated or partly esterified as desired) with at least 1 molar proportion of alkylene oxide, preferably at a temperature below 60° C., and vacuum stripping to remove any unreacted alkylene oxide. If a product containing polyoxyalkylene chains is desired, more than one molar proportion of alkylene oxide per free hydroxyl group should be employed and the reaction temperature allowed to rise to 120° C. The reaction cannot be carried out without risk of charring at temperatures higher than 200° C.

The acylated condensates may be formed from the condensates by the same reactions as are used for preparing the acylated acid.

Polyesters according to the invention are conveniently prepared by reacting an acyldiphosphonic acid (preferably in conjunction with polybasic carboxylic acids or anhydrides thereof such as phthalic anhydride, succinic anhydride or maleic anhydride) with one or more polyhydric alcohols such as ethylene glycol, glycerol, trimethylolpropane, polyethylene glycol, pentaerythritol, or with unsaturated alcohols such as butene-1,4-diol, or a precondensate of the invention. Alternatively all the acyldiphosphonic acid units may be introduced into the polymer structure by the use of a precondensate of the invention. In the latter instance, it may be convenient to employ 1 equivalent of a condensate of the invention, 1 equivalent of an additional polyhydric alcohol and 2 equivalents of the polybasic carboxylic acids or anhydrides.

Where an ethylenically unsaturated compound, such as maleic anhydride, or butene 1,4-diol is employed in the manufacture of a polyester according to our invention, the resulting polyester may be cured by copolymerisation with a vinylic material such as styrene. This may conveniently be achieved by heating the unsaturated polyester with from 15 to 30% by weight of a vinylic material which is preferably styrene in the presence of an initiator such as benzoyl peroxide and a catalyst such as cobalt naphthenate.

It is often advantageous to prepare a copolymer system comprising a mixture of two or more different unsaturated polyesters copolymerised with an ethylenic material such as styrene. One of the component unsaturated polyesters may be the reaction product of: one equivalent of a polyol or mixture of polyols; and one equivalent of an unsaturated polybasic acid or anhydride, or a mixture of acids and/or anhydrides containing a useful proportion of unsaturated acid or anhydride (e.g. maleic anhydride). The polyol or diol employed may also contain ethylenic unsaturation (e.g. 2-butene-1,4-diol). Another of the unsaturated polyester components may contain: one equivalent of a precondensate according to the invention or a mixture of polyols comprising a precondensate of the invention; together with one equivalent of a polybasic acid or anhydride, or mixtures of acids and anhydrides containing a significant proportion of an unsaturated difunctional acid (e.g. maleic acid). The diols or polyols admixed with the precondensate of the invention may optionally include alcohols containing ethylenic unsaturation, e.g. 2-butene-1,4-diol.

I have found that the degree of flame-retardance of a polyester, modified according to our invention, is enhanced by incorporating therein a halogen-containing material. For example the precondensate may be formed from an epihalohydrin, particularly from acetaldiphosphonic acid and epichlorhydrin. The precondensate may also advantageously be used in conjunction with a halogen containing acid, or all the halogen may be introduced in the acid component of the polyester. Suitable halogen containing acids or anhydrides which may be employed include tetrachlorophthalic anhydride or any highly halogenated dicarboxylic acid or anhydride commonly employed for the modification of polyesters. Such modified materials preferably contain from 0.5 to 5% by weight phosphorus and up to 25% by weight of halogen.

Particularly suitable formulations include condensates containing from 9 to 15 molar proportions of alkylene oxide per mole condensate, and in particular a propylene oxide condensate, which is preferably employed in conjunction with tetrachlorphthalic anhydride.

The proportion of phosphorus in the polymers required to give a reproduceable self-extinguishing result is dependent upon the formulation of the polyester and the way in which the phosphorus is incorporated. Generally speaking, polyesters are more effectively modified if a compound of the invention is incorporated into the polymer molecule at a site near one end, rather than in the middle of the molecule. Thus, for example a monofunctional compound of the invention, which acts as an end stopper, is often more effective for modifying polyesters than a difunctional compound. However it is possible to incorporate more of the difunctional material into the polymer, therefore it is normally advantageous to use mixtures of polyfunctional and monofunctional material. Useful modification is seldom obtained if the polymer contains less than about 0.1% of phosphorus.

The invention is illustrated by the following examples in which all proportions are by weight unless otherwise stated.

EXAMPLE 1

Acetodiphosphonic acid monohydrate (224 grams) was added slowly to 638 grams propylene oxide, with stirring, the mixture being cooled, to maintain it at approximately 35° C. during the initial exothermic reaction. When this stage was completed and the reaction mixture had become a clear homogeneous viscous liquid the temperature was raised to 70° C. and any excess propylene oxide stripped off under vacuum.

Analysis of the condensation product gave: P, 7.2%; C, 49.0%.

EXAMPLE 2

206 grams of anhyrous acetodiphosphonic acid were stirred into 290 grams of propylene oxide contained in a flask. The mixture was allowed to reflux gently without external heating, at a temperature of about 35° C. When all solid material had disappeared, external heat was supplied and the temperature raised gradually to 90–100° C., at which temperature a further 290 grams of propylene oxide was added dropwise with stirring, care being taken to prevent the temperature rising above 100° C. The reaction was nearly complete when propylene oxide was no longer observed to be refluxing in the condenser. The temperature was then raised to 120–130° C. which temperature was maintained for 2½ hours.

Analysis gave: C, 49%; P, 8%.

EXAMPLE 3

Acetodiphosphonic acid monohydrate (224 grams) was added slowly, with stirring, to 1110 grams epichlorhydrin (12 molar proportions). The temperature was maintained between 80 and 90° C. After a homogeneous clear viscous liquid had been obtained the temperature was raised to the range 120 to 140° C., and the excess epichlorhydrin was stripped off under vacuum.

Analysis gave: C, 34.2%; P, 4.7%; Cl, 32.0%.

EXAMPLE 4

The process of Example 3 was repeated, but employing 11 molar proportions of epichlorhydrin to 1 of anhydrous acetodiphosphonic acid and employing initial reaction temperatures between 110°–120° C.

Analysis gave: C, 34.3%; P, 5.1%; Cl, 23.5%.

EXAMPLES 5 to 11

In each of these examples all the components apart from the styrene were mixed in the order given, together with approximately 60 ccs. of xylene and heated in a resin flask to approximately 140° C. in a nitrogen atmosphere. Water was removed by azeotropic distillation. After 5–6 hours, water ceased to be evolved. After a further period of heating at approximately 180° C., during which the acid number of the product continued to decrease in the range from 80 to 60 gms. KOH/g. resin, 50 p.p.m. of toluohydroquinone (a gellation inhibitor) was stirred into the resin and the xylene distilled off under a slightly reduced pressure. In each case the resin was then cooled to approximately 90° C. and the required quantity of warm styrene (containing 5 p.p.m. of tertiary butyl catechol or a similar free radical inhibitor) was added with stirring.

The uncured resin could be stored in this condition. The use of 0.1% of a solution of cobalt naphthenate in white spirit and 1% of benzoyl peroxide based on the weight of styrene content added, enabled the resin to be cured in a mould in the form of strips. The resins were cured for 15 hours at 80° C. In each of the examples a hard, pliable, semi-opaque polymer was formed, which was tested by A.S.T.M. 635/56T for fire-retardance. This test involves heating strips of the resin under specified conditions in the flame of a Bunsen burner, removing the Bunsen burner, allowing the flame to be extinguished, re-igniting the strip in the Bunsen flame, and measuring the time in which the material is extinguished, after the second ignition. In addition, the distance that the resin burns beyond a mark 1" from the heated end of the strip is measured.

With all the resins of Examples 5–11, the charring did not extend as far as the measured mark indicating a highly satisfactory inhibition of the spread of flame, which was extinguished in between 3–10 seconds.

EXAMPLE 5

| | Moles | Gms. |
|---|---|---|
| Product from Example 1 | 1.5 | 1206 |
| Ethylene glycol | 2.0 | 124 |
| Maleic anhydride | 2.0 | 196 |
| Phthalic anhydride | 3.0 | 444 |
| Styrene | 3.61 | 376 |

Final phosphorus content 4.1%. A.S.T.M. 635/56T gave an extinction time 8 seconds.

EXAMPLE 6

| | Moles | Gms. |
|---|---|---|
| Product from Example 2 | 0.3 | 236 |
| Ethylene glycol | 2.4 | 149 |
| Maleic anhydride | 1.4 | 137 |
| Tetrachlororophthalic anhydride | 1.6 | 458 |
| Styrene | 1.78 | 185 |

Phosphorus content of final polymer, 1.67%; chlorine content of final, polymer; 20.4%. Extinction time 5 seconds.

EXAMPLE 7

| | Moles | Gms. |
|---|---|---|
| Production from Example 4 | 0.1 | 122 |
| Ethylene glycol | 0.9 | 56 |
| Maleic anhydride | 0.6 | 59 |
| Phthalic anhydride | 0.2 | 30 |
| Tetrachlorophthalic anhydride | 0.3 | 86 |
| Styrene | 0.65 | 67 |

Finished resin contains Phosphorus, 2.8%; chlorine, 17.7%. Extinction time 3 seconds.

EXAMPLE 8

| | Moles | Gms. |
|---|---|---|
| Product from Example 4 | 0.1 | 122 |
| Ethylene glycol | 0.9 | 56 |
| Maleic anhydride | 0.6 | 59 |
| Phthalic anhydride | 0.2 | 30 |
| Tetrachlorophthalic anhydride | 0.3 | 86 |
| Styrene | 0.65 | 67 |

Finished resin contains 1.55% phosphorus, 20.4% chlorine. Extinction time 5 seconds.

EXAMPLE 9 (INGREDIENTS IN ORDER OF MIXING)

| | Moles | Gms. |
|---|---|---|
| Ethylene glycol | 1.1 | 68 |
| Phthalic anhydride | 0.2 | 30 |
| Maleic anhydride | 0.4 | 39 |
| Tetrachlorophthalic anhydride | 0.3 | 86 |
| Acetodiphosphonic acid (anhydrous) | 0.1 | 21 |
| Styrene | 0.42 | 44 |

The finished resin contained 2.34% phosphorus, 16.1% chlorine. Extinction time 8 seconds.

EXAMPLE 10

| | Moles | Gms. |
|---|---|---|
| 2-butene-1-4-diol | 1.4 | 88 |
| Anhydrous acetodiphosphonic acid | 0.15 | 31 |
| Phthalic anhydride | 0.7 | 104 |
| Styrene | 0.38 | 40 |

The finished resin contained 2.9% phosphorus. Extinction time = 10 seconds.

EXAMPLE 11

| | Moles | Gms. |
|---|---|---|
| Ethylene glycol | 1.8 | 112 |
| 2-butene-1-4diol | 1.0 | 88 |
| Phthalic anhydride | 2.0 | 296 |
| Anhydrous acetodiphosphonic acid | 0.4 | 82 |
| Styrene | 1.0 | 103 |

The finished resin contains 4.03% phosphorus. Extinction time = 8 seconds.

EXAMPLE 12

| | Moles | Gms. |
|---|---|---|
| Product of Example 4 | 0.1 | 122 |
| Ethylene glycol | 0.8 | 50 |
| Maleic anhydride | 0.7 | 69 |
| Tetrachlorophthalic anhydride | 0.3 | 86 |
| Styrene | 0.89 | 93 |

Percentage phosphorus 1.54, percentage chlorine 20.2, percentage hydrolysed in boiling water 25.1. Extinction time 22 seconds.

EXAMPLE 13

| | Moles | Gms. |
|---|---|---|
| Product of condensation of 10 moles propylene oxide with 1 mole acetodiphosphonic acid | 0.12 | 94 |
| Ethylene glycol | 1.0 | 62 |
| Maleic anhydride | 0.54 | 53 |
| Tetrachlorophthalic anhydride | 0.7 | 200 |
| Styrene | 1.12 | 116 |

Percentage phosphorus 1.48, percentage chlorine 9.8, percentage hydrolysed in boiling water 9.3. Extinction time 1 second.

I claim:
1. A phosphonate ester having the formula

$$\begin{array}{c} X(OCHCH_2)_nO \quad O \quad R \quad O \quad O(CH_2CHO)_nX \\ | \qquad \qquad \backslash \| \quad | \quad \|/ \qquad | \\ R'' \qquad \qquad P-C-P \qquad \qquad R'' \\ X(OCHCH_2)_nO / \qquad \qquad \backslash O(CH_2CHO)_nX \\ | \qquad \qquad \qquad \qquad \qquad \qquad | \\ R'' \qquad \qquad \qquad \qquad \qquad \qquad R'' \\ \qquad \qquad O(CH_2CHO_mX \\ \qquad \qquad \qquad | \\ \qquad \qquad \qquad R'' \end{array}$$

wherein $m$ is a number from 0 to 20, each $n$ is a number from 1 to 20, each X is selected from the group consisting of hydrogen, acetyl and benzoyl with at least one X being hydrogen, R is selected from the group consisting of alkyl, chlorinated alkyl, phenyl and chlorinated phenyl having up to 10 carbon atoms, and each R'' is selected from the group consisting of hydrogen, methyl, chloromethyl and bromomethyl groups.

2. The phosphonate ester of claim 1 wherein X is hydrogen and R is methyl.

References Cited

UNITED STATES PATENTS 2,372,244   3/1945   Adams et al. ___ 260—978 XR
2,587,340   2/1952   Lewis et al. _____ 260—978 XR
2,875,231   2/1959   McConnell et al. __ 260—932 XR CHARLES B. PARKER, Primary Examiner A. H. SUTTO, Assistant Examiner U.S. Cl. X.R.

260—978, 75, 870, 502.4

UNITED STATES PATENT OFFICE
CERTIFICATE OF CORRECTION

Patent No. 3,525,782                Dated August 25, 1970

Inventor(s) JAMES KEITH JACQUES

It is certified that error appears in the above-identified patent and that said Letters Patent are hereby corrected as shown below:

Column 8, line 43, that portion of the formula reading

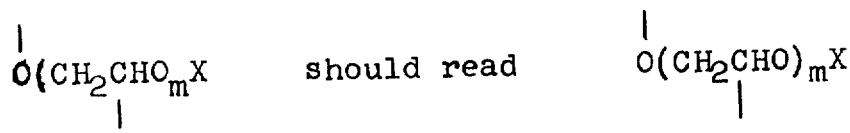

SIGNED AND SEALED

OCT 27 1970

(SEAL)
Attest:

Edward M. Fletcher, Jr.
Attesting Officer

WILLIAM E. SCHUYLER, JR.
Commissioner of Patents